Oct. 10, 1944.                J. E. BUXTON                 2,359,968
                         ENGINE STARTER GEARING
                           Filed Dec. 7, 1942
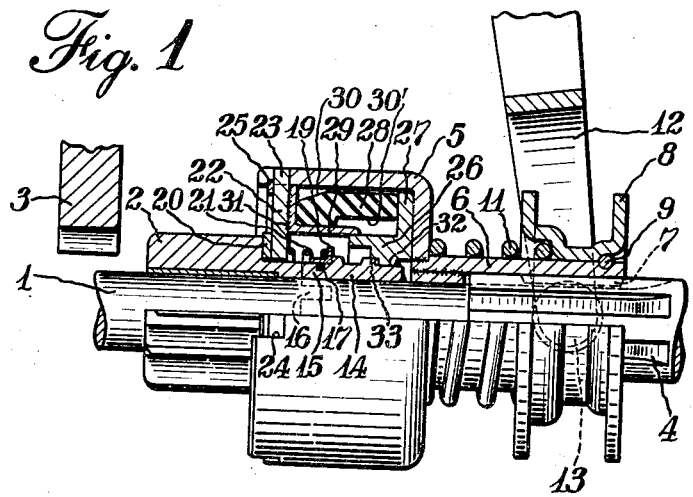
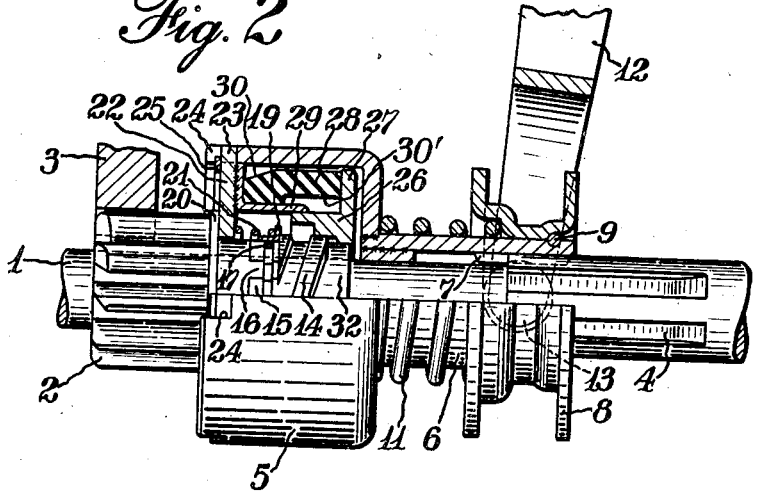
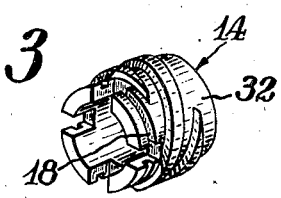
Witness:                                          INVENTOR.
Burr W. Jones                            BY  James E. Buxton
                                             Clinton S. Janes
                                                      ATTORNEY Patented Oct. 10, 1944

2,359,968

UNITED STATES PATENT OFFICE 2,359,968

ENGINE STARTER GEARING

James E. Buxton, Elmira, N. Y., assignor to Bendix Aviation Corporation, South Bend, Ind., a corporation of Delaware Application December 7, 1942, Serial No. 468,147

5 Claims. (Cl. 74—6)

The present invention relates to engine starter gearing and more particularly to a manually operable gear shift with an overrunning clutch connection and yielding torque transmitting means.

It is an object of the present invention to provide a novel starter gear which is efficient and reliable in operation while being simple and economical in construction.

It is another object to provide such a device in which the driving forces are so distributed as to avoid localized or unbalanced stresses.

It is another object to provide such a device including an overrunning connection which transmits torque without slipping and overruns freely without sticking or jamming.

It is another object to provide such a device including a yielding torque-transmitting member which is always maintained under sufficient compression to avoid slippage.

Further objects and advantages will be apparent from the following description taken in connection with the accompanying drawing, in which:

Fig. 1 is a side elevation partly in section of a preferred embodiment of the invention;

Fig. 2 is a similar view showing the parts in driving position; and

Fig. 3 is a detail in perspective of the screw shaft which is coupled to the pinion.

In Fig. 1 of the drawing there is illustrated a power shaft 1 on which a pinion 2 is slidably journalled for movement into and out of engagement with a member such as a gear 3 of an engine to be started. Shaft 1 is provided with a splined section 4, and a barrel member 5 is slidably keyed thereon by means of a sleeve extension 6 having internal keys or feathers 7 slidably engaging the splined portion of the shaft.

Manually operable means for shifting the barrel 5 longitudinally is provided in the form of a shift collar 8 confined on the sleeve 6 by a lock ring 9 and pressed against the lock ring by a spring 11. A shifting fork 12 is provided with trunnions 13 engaging in the collar 8 and is arranged to be moved by the operator in any suitable manner to effect the desired motion of the barrel.

A screw shaft 14 is slidably journalled on the shaft 1 within the barrel 5 and is rigidly coupled to the pinion 2 as by means of inter-engaging lugs 15 and 16 on the screw shaft and pinion respectively and a lock ring 17 seated in a groove 18 formed in said lugs and retained therein by a collar 19 which is held in its seat by a spring 21.

A flange member 22 is fixed in the open end of the barrel 5 as by means of radial lugs 23 seated in slots 24 in the barrel and a lock ring 25 retaining the flange member in the barrel. The inner portion of the flange member bears against a shoulder 20 on the pinion. This shoulder is preferably formed by pressing and/or brazing a ring or washer against the ends of the pinion teeth. A nut member 26 having a radial flange 27 is threaded on the screw shaft 14, and a cylindrical block 28 of elastically deformable material such as rubber is located in the barrel between the flange member 25 and the flange 27 of nut member 26. According to the present invention, the rubber block is bevelled exteriorly as indicated at 30 and is provided with an enlarged bore 30' for a portion of its length from the driven end. This formation provides adequate space into which the rubber may flow as it is deformed by pressure between the flanges 22 and 27, so that the rubber will never completely fill the space between said flanges under any operative conditions. The importance of the proper proportioning of the space available for deformation of the rubber block is based on the fact that rubber, though readily deformable, is substantially incompressible so far as its total volume is concerned. If insufficient space is provided therefore, so that the rubber when under pressure completely fills the space, the connection becomes practically rigid, and peak torques may be developed which render the starting operation noisy and unnecessarily harsh. A thimble 29 is preferably interposed between the flange member 22 and the rubber block and is fixed to the flange member in any suitable manner as by welding or brazing as indicated at 31. This thimble serves to provide a seat for the rubber block and helps to prevent any particles of rubber from coming in contact with the screw threads of the nut and screw shaft.

Acording to the present invention the screw shaft 14 is provided with a smooth portion 32 adjacent its free end, and the nut 26 is counterbored at 33 sufficiently to allow the nut to run off the ends of the threads on the screw shaft when the pinion and screw shaft are rotated more rapidly than the barrel. In order that this overrunning action may take place without any slippage between the rubber block 28 and the flange members, the parts are so proportioned that the lock ring 25 maintains the rubber block under sufficient compression at all times to prevent such slippage.

In operation, starting with the parts in the positions illustrated in Fig. 1, operation of the shifting fork 12 by the operator causes the barrel 5 with the screw shaft 14 and pinion 2 to be slid longitudinally until the pinion is meshed with the engine gear 3. At this time the starting motor, not illustrated, is energized to rotate the shaft 1, which rotation is transmitted through the splines to the barrel 5 and flange member 22. The nut 26 is thus caused to rotate by its frictional connection through the rubber block 28, which rotation causes the nut to thread itself along the screw shaft 14, compressing the rubber block 28 until the torque transmitted through the nut and screw shaft and through frictional engagement of the flange member 22 with the shoulder 20 on the pinion 2 causes it to rotate and crank the engine. When the engine starts, the acceleration of the pinion 2 by the engine gear causes the screw shaft to thread the nut 26 backward until it runs off the end of the threads of the screw shaft, after which the screw shaft overruns freely until such time as the operator actuates the shift fork 12 to withdraw the pinion from mesh. Thereafter the spring 21 serves to ensure initial entry of the threads of the screw shaft 14 within the nut 26.

It will be seen that by the structure herein disclosed, applicant has provided an overrunning connection which will disengage freely without setting up localized stresses or causing severe pressures to be exerted, and in which the cushioning element is at all times capable of compression and torsion, but is not subject to abrasion by friction.

Although but one embodiment of the invention has been shown and described in detail, it will be understood that other embodiments are possible and that various changes may be made in the design and arrangement of the parts without departing from the spirit of the invention as defined in the claims appended hereto.

What is claimed is:

1. In an engine starter a power shaft, a barrel member having an extension slidably but non-rotatably mounted on the shaft, manually operable means for shifting the barrel along the shaft, a flange member fixed in the end of the barrel, a flanged nut within the barrel, a cylinder of elastically deformable material in the barrel between said flange member and the flange of the nut, a screw shaft traversing the nut, and a pinion fixed to the screw shaft having a shoulder engaging the flange member.

2. Engine starter gearing as set forth in claim 1 in which the nut is arranged to run off the ends of the threads on the screw shaft and thereby permit the screw shaft to overrun freely.

3. Engine starter gearing as set forth in claim 1 in which the nut is arranged to run off the ends of the threads of the screw shaft, and the flange member and flanged nut are so confined in the barrel that the cylinder of elastically deformable material is maintained under initial compression therebetween at all times.

4. In an engine starter a power shaft, a pinion slidably journalled thereon, a screw shaft fixed to the pinion, a nut on the screw shaft, a barrel member surrounding the pinion having an extension slidably but non-rotatably mounted on the power shaft, a flange member fixed in the barrel and swiveled to the pinion, said nut having a flange, and a cylinder of elastically deformable material between said flange, the threads of the nut and screw shaft being so arranged as to permit the nut to run off the ends of the threads of the screw shaft and overrun freely.

5. In an engine starter a power shaft, a pinion slidably journalled thereon, means for transmitting torque from the shaft to the pinion including a barrel member having an extension splined to one of said members, a flanged nut in the barrel, means providing a threaded connection between the nut and the other said member, and a cylindrical block of elastically deformable material in the barrel in abutting relation with said flange of the nut, the dimensions of the barrel and elastic member being so proportioned that the elastic member has space available for deformation in the barrel under all conditions of operation.

JAMES E. BUXTON.